United States Patent [19]

Burst et al.

[11] Patent Number: 4,913,347
[45] Date of Patent: Apr. 3, 1990

[54] AIR-CONDITIONING SYSTEM FOR AN AIR-COOLED MOTOR VEHICLE

[75] Inventors: Hermann Burst, Rutesheim; Walter Pross, Sindelfingen; Horst Petri, Hemmingen, all of Fed. Rep. of Germany

[73] Assignee: Dr. Ing. h.c.F. Porsche AG, Fed. Rep. of Germany

[21] Appl. No.: 379,961

[22] Filed: Jul. 14, 1989

[30] Foreign Application Priority Data

Jul. 21, 1988 [DE] Fed. Rep. of Germany ....... 3824794

[51] Int. Cl.⁴ .......................................... G05D 23/13
[52] U.S. Cl. ....................................... 236/13; 62/244; 98/2.11; 165/43
[58] Field of Search ............. 236/13; 62/244; 165/42, 165/43; 237/12.3 A; 98/2.11

[56] References Cited

U.S. PATENT DOCUMENTS

| | | | |
|---|---|---|---|
| 2,764,354 | 9/1956 | Peterson et al. | 236/13 X |
| 2,833,298 | 5/1958 | Shannon | 236/13 X |
| 3,428,115 | 2/1969 | Caldwell | 236/13 X |
| 3,752,223 | 8/1973 | Finch | 165/43 |
| 3,934,642 | 1/1976 | Coulson et al. | 165/42 X |
| 4,210,278 | 7/1980 | Obler | 236/13 X |
| 4,482,009 | 11/1984 | Nishimura et al. | 62/244 X |
| 4,718,244 | 1/1988 | Kobayashi | 62/244 X |

Primary Examiner—William E. Tapolcai
Attorney, Agent, or Firm—Barnes & Thornburg

[57] ABSTRACT

So that, in the case of a preferably air-cooled vehicle, the air-conditioning system responds rapidly to changing heated-air temperatures as well as fluctuations in volume, heated air and/or fresh air and/or circulating air or cooled air is together guided to a fan, is swirled together and mixed in this fan and is subsequently, by way of outflow ducts, guided to the vehicle interior. A blow-out temperature sensor arranged behind the fan continuously scans the temperature deviation of the mixed air from the adjusted desired temperature and, as necessary, automatically corrects the position of a temperature mixing flap provided in front of the fan.

9 Claims, 4 Drawing Sheets

AIR-CONDITIONING SYSTEM FOR AN AIR-COOLED MOTOR VEHICLE

BACKGROUND OF THE INVENTION

The invention relates to an air-conditioning system for an air-cooled motor vehicle of the type having a housing in which an evaporator, a chamber and at least one fan are arranged, the housing having outflow ducts with individually blockable defroster nozzles, center nozzles and leg area nozzles, through which heated air and/or cold air can selectively be introduced into the vehicle interior, the housing being connected with at least one heated-air duct containing an exhaust heat exchanger as well as with inflow ducts for fresh air and circulating air.

In a known air-conditioning system of the initially mentioned type described in German Published Unexamined patent application (DE-OS) No. 32 17 825, the housing is provided with a mixing chamber, at least one inflow duct for heated air, one inflow duct for fresh air and one inflow duct for cooled air leading into this mixing chamber. In the mixing chamber, an adjustable partition is provided which considerably influences the distribution of the entering air flows to the outlet ducts. The arrangement of the partitions results in a thermal stratification. This arrangement has the disadvantage that the considerably fluctuating heated air temperatures which occur particularly in an air-cooled vehicle as well as the fluctuations of volume are very difficult to compensate.

It is an object of the invention to take such measures at an air-conditioning system for a preferably air-cooled vehicle that the varying heated-air temperatures as well as the volume fluctuations can be compensated rapidly so that a uniform temperature exists in the vehicle interior.

According to the invention, this object is achieved by providing an arrangement, wherein heated air and/or fresh air and/or circulating air or cooled air is jointly introduced into at least one fan and is swirled together and mixed in this fan, and wherein the mixed air is guided subsequently by way of individual outflow ducts to the vehicle interior, and wherein a blow-out sensor is arranged behind the fan for scanning the temperature deviation ($\Delta T$) of the mixed air from the adjusted desired temperature and, as a function of the temperature deviation ($\Delta T$), automatically correcting the position of a temperature mixing flap provided in front of the fan.

Principal advantages achieved by the invention are that, by means of the swirling-together and mixing of the individual air flows (heated air, fresh air, circulating air, cooled air) in the fan wheel of the fan and the automatic connecting of the temperature mixing flap, a largely constant temperature is achieved in the vehicle interior. The occurring fluctuations of the temperature and of the volume of the heated-air flow are therefore compensated rapidly. The differential-pressure-controlled flaps arranged in the heated-air duct behind the exhaust heat exchangers have the result that the hot air is blown off, if necessary, and air can also flow through the heat exchangers during the summer. When the temperature mixing flap closes the heated-air duct, the differential-pressure controlled flap opens automatically. By means of the arrangement according to the invention, mainly a fast response of the air-conditioning system is achieved to changing temperatures or volume fluctuations and an almost uniform air temperature at all outlet ducts.

Other objects, advantages and novel features of the present invention will become apparent from the following detailed description of the invention when considered in conjunction with the accompanying drawings.

DETAILED DESCRIPTION OF THE DRAWINGS

Figure 1:
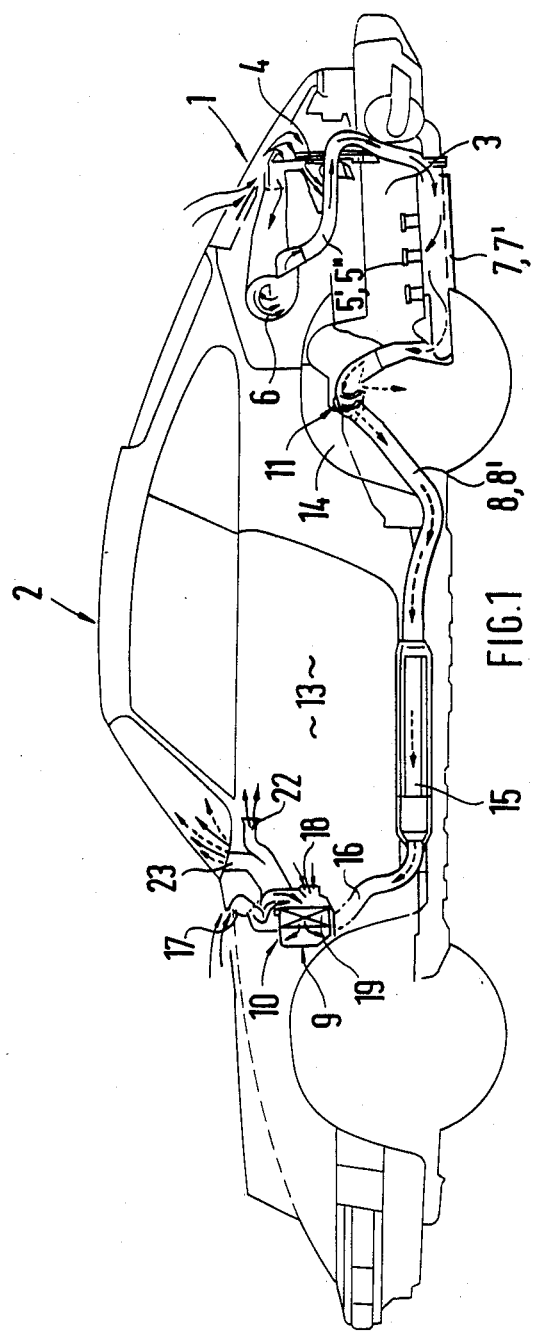
FIG. 1 is a lateral view of an air-cooled passenger car with an air-conditioning system constructed in accordance with a preferred embodiment of the present invention.
Figure 2:
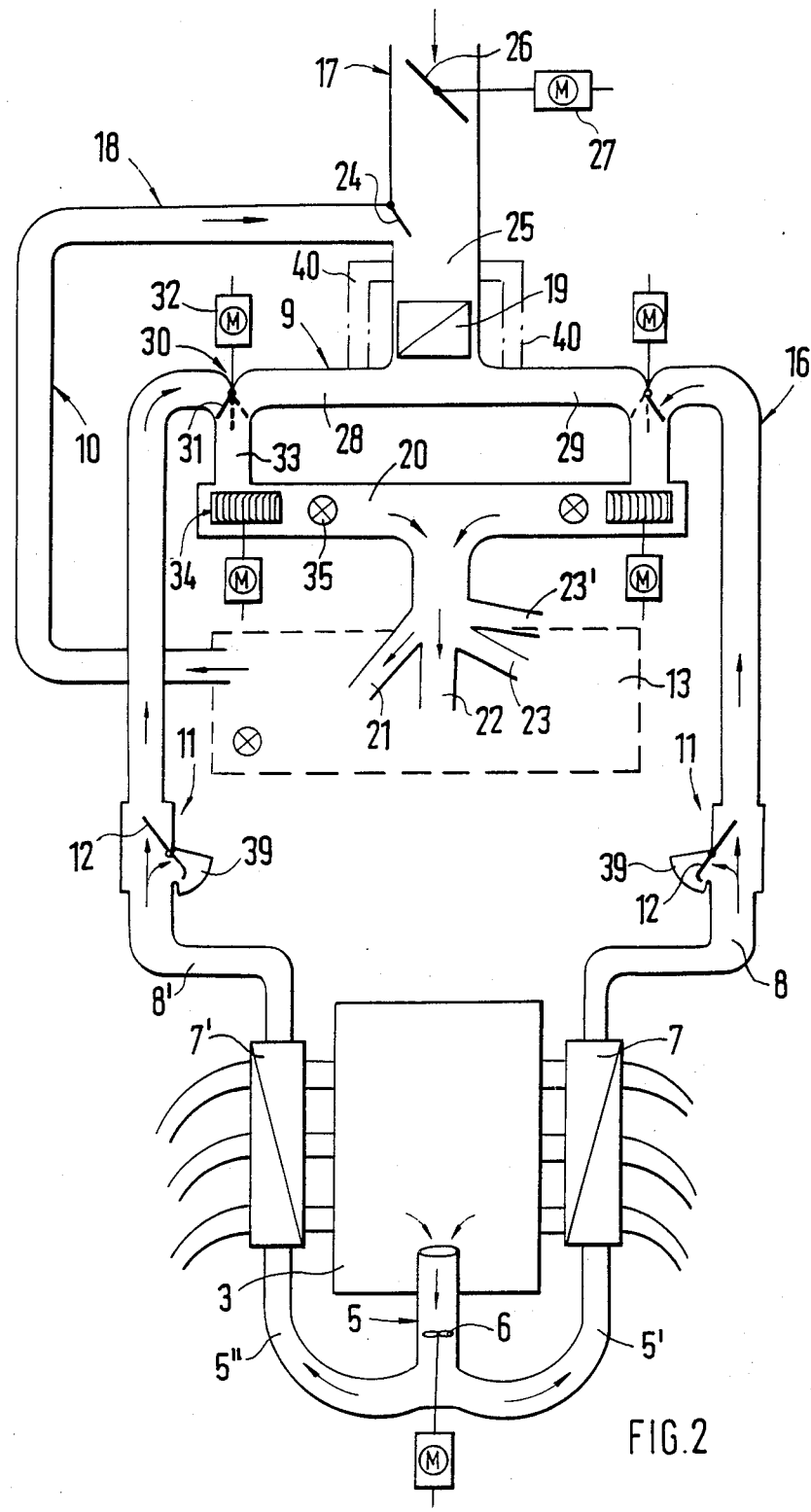
FIG. 2 is a schematic representation of the air conditioning system of FIG. 1.
Figure 3:
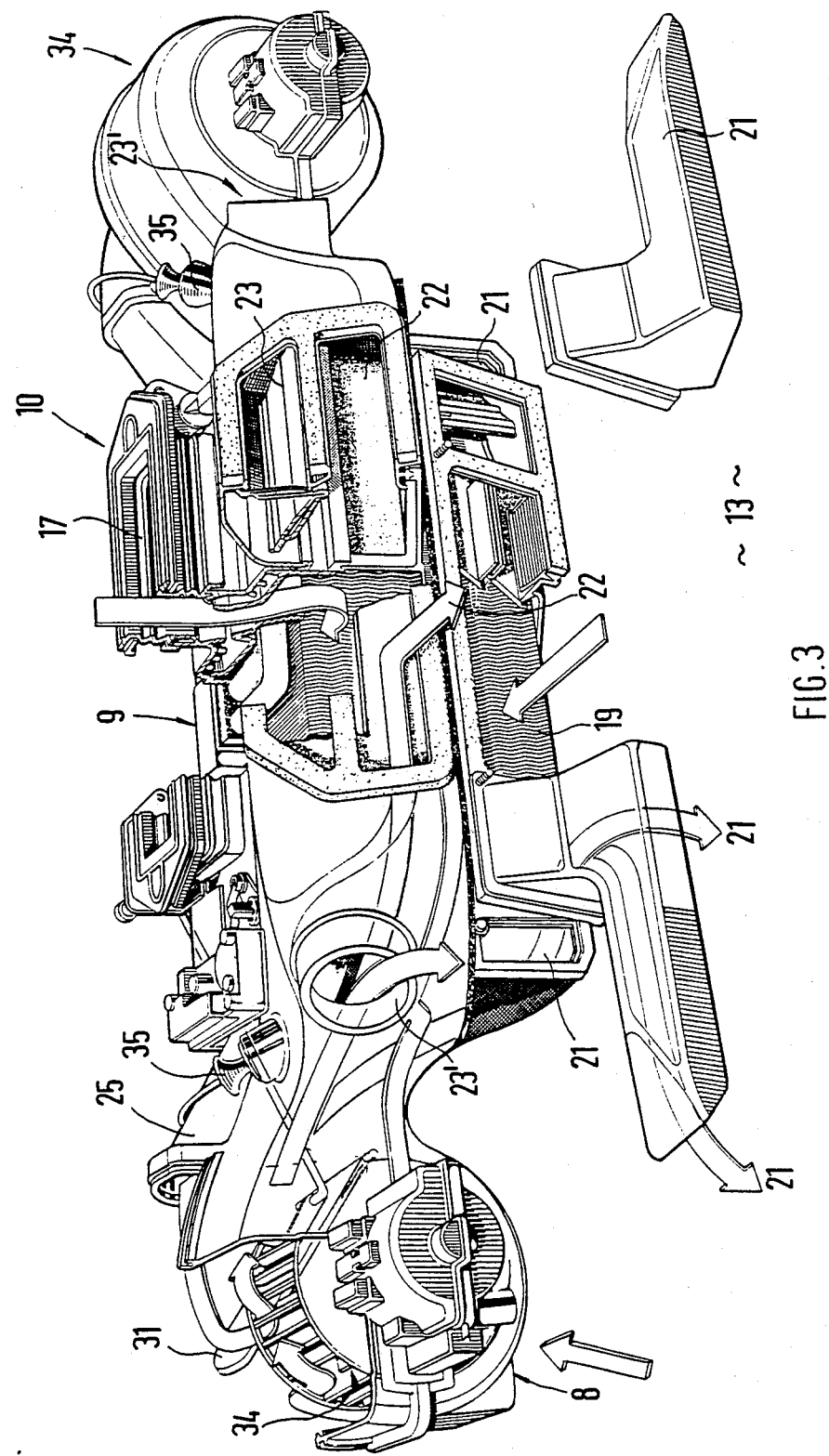
FIG. 3 is a partially sectional perspective representation of the housing of the air-conditioning system of FIGS. 1 and 2.

FIG. 1 shows an air-cooled internal-combustion engine arranged in the rear 1 of a motor vehicle (passenger car) 2 and having an engine cooling fan 4 and exhaust pipes 5. A part of the fresh air taken in by the engine cooling fan 4 is taken in by an electric heater fan 6 starting with which the exhaust pipe 5 is divided into two legs 5', 5". The fresh air is heated by exhaust heat exchangers 7, 7' according to the operating condition of the internal-combustion engine and is guided toward the front in heated-air ducts 8, 8'. The exhaust heat exchangers 7, 7' surround the exhaust pipes 5', 5" in sections. In the embodiment shown, a separate exhaust heat exchanger 7 or 7' is assigned to each of the two cylinder banks of the internal-combustion engine 3. Originating from the exhaust heat exchangers 7, 7', heated-air ducts 8, 8' are provided which carry the heated air and lead into a housing 9 of an air-conditioning system 10.

In both heated-air ducts 8, 8', one flap box 11 respectively with a differential-pressure-controlled flap 12 is arranged behind the heat exchangers 7, 7', so that the heated air is either guided into the housing 9 of the air-conditioning system 10 or is blown off toward the outside into the open air (wheel house 14). In addition, mufflers 15 are arranged in both heated-air ducts 8, 8'.

The air-conditioning system 10 comprises essentially a housing 9 with inflow ducts 16, 17, 18, for the heated air, the fresh air and the circulating air or the cooled air, an evaporator 19, a pressure chamber 20 containing two fans 34 as well as outflow ducts 21, 22, 23, 23' for the mixed air. Inflow duct 16 is assigned to the heated air; inflow duct 17 guides the fresh air; and inflow duct 18 guides the circulating air. Outflow duct 21 leads into the leg area; outflow duct 22 leads to the central nozzle; outflow duct 23 leads to the defroster nozzle; and outflow duct 23' leads to the side nozzles.

Individually blockable nozzles, which are not shown in detail, are provided in front of the outlet openings of all outflow ducts 21, 22, 23, 23'. Through these individually blockable nozzles, air with selected temperatures can be introduced into the vehicle interior 13. The inflow duct 18 for circulating air which leads from the vehicle interior 13 into the inflow duct 17 for fresh air, in the connecting area, has a pressure-loaded circulating-air flap 24 so that either fresh air or circulating air or a mixture of fresh air and circulating air can flow into the cold-air leg 25. The circulating-air flap 24 is pivotable at one of its ends (flutter valve).

A fresh-air flap 26 is provided in the inflow duct 17 for fresh air and is controlled by means of an electric adjusting motor 27. The fresh-air flap 26 is disposed in the center and is controlled as a function of the speed and of the fan stage. It is shut in the circulating-air operation at "max. cold" and "max. heating".

Behind the guiding-together of the inflow ducts 17, 18, the evaporator 19 is arranged in the common cold-air leg 25. Behind the evaporator 19, the cold-air leg 25 is divided into two sections 28, 29 leading to the side, each section 28, 29 being guided together with a heated-air duct 8, 8' and 16 which is arranged laterally on the outside. In each connecting area 30, a temperature mixing flap 31 is provided by means of which the composition of heated air and cold air is freely selectable. Each temperature mixing flap 31 cooperates with an adjusting motor 32. Behind each temperature mixing flap 31, a duct 33 leads to the pressure chamber 20, in which the two fans 34 are arranged laterally on the outside. The fans 34 are constructed as radial fans and are arranged on the suction side with respect to the heated air and the evaporator 19. Blow-out temperature sensors 35 are provided at the housing 9 behind the fans 34.

In this air-conditioning system 10, according to the invention, heated air and/or fresh air and/or circulating air or cooled air together is guided to at least one fan 34, is swirled together and mixed in this fan and, after a further mixing in the pressure chamber 20, is guided to the individual outflow ducts 21, 22, 23, 23'.

Figure 4:
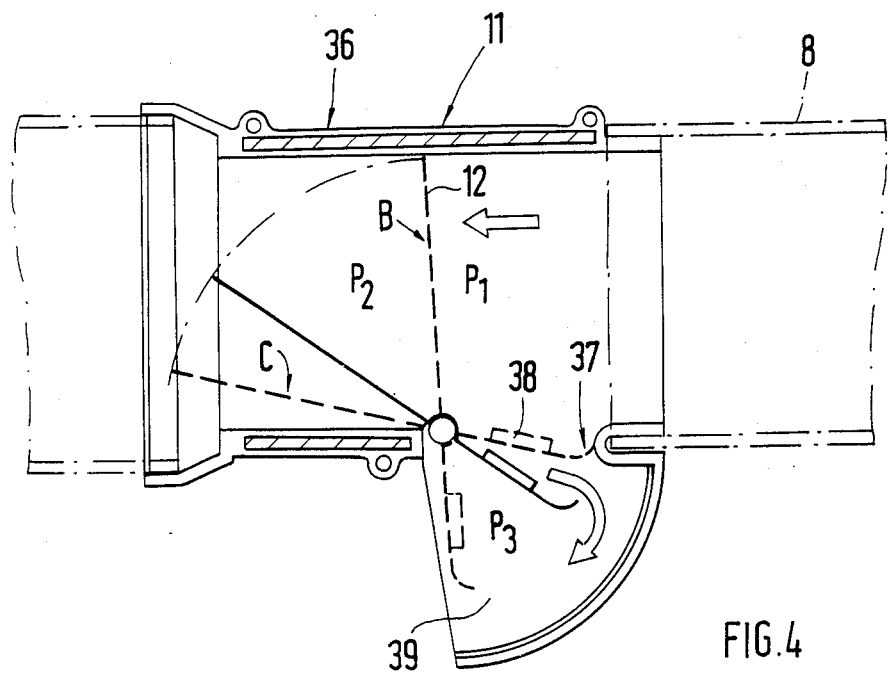
FIG. 4 is an enlarged sectional view of the differential-pressure-controlled flaps arranged in the heated-air duct of the air-conditioning system of FIGS. 1–3.

The two blow-out temperature sensors 35 behind the fans 34 continuously scan the temperature deviation $\Delta T$ from the adjusted desired temperature and, if necessary, automatically correct the position of the temperature mixing flaps 31. When a defined maximum temperature (for example, 95° C.) is reached, the temperature mixing flaps 31 are adjusted such that no more heated air can flow into the fan 34. The differential-pressure-controlled flaps 12 arranged in the two heated-air ducts 8, 8' operate as a function of the position of the temperature mixing flap 31; i.e., when the heated-air duct 8 is shut, the differential-pressure-controlled flap 12 will open automatically, and the heated air flows through the exhaust air opening 39 into the open air. The differential-pressure-controlled flap 12 comprises a two-part housing 36 made of aluminum die castings and a flap made of high-alloy sheet metal which is disposed almost in the center (FIG. 4). At the lower end, the flap 12 is provided with a spoiler 37 and with a balancing weight 38. In the installed position, the flap 12 is disposed approximately vertically in the housing 36 (Position B —max. cooling), and the heated air can flow out toward the outside into the open air. In position B, the exhaust air is discharged into the wheel house 14 in a targeted manner, so that components, such as brake hoses, etc., are not heated.

When pressure P1 becomes higher than pressure P2, flap 12 moves from position B into position C (—max. heating). Intermediate positions are dynamically possible according to the $P_{dyn}$.

Under the given space conditions, the use of a spoiler 37 at the cap end and of a balancing weight 38 is required because otherwise the desired position C cannot be reached. In all operating conditions, it is prevented that exhaust gases are taken in by way of the exhaust opening 39. Pressure P1 is always higher than pressure P3. In position C (max. heating), the flap 12 provides a tight sealing together with the housing 36; i.e., the exhaust opening 39 is shut. Thus, the complete air flow reaches the housing 9 of the air-conditioning system 10.

So that the pressure loss of the evaporator 19 is eliminated, a circulating-air/fresh-air by-pass 40, which is shown by a dash-dotted line, may also be provided in the air-conditioning system 10, so that under certain operating conditions, only a small amount of fresh air/circulating air or no fresh air/circulating air at all flows through the evaporator 19, but flows around it. For the muffling of noise, walls in the pressure chamber 20 are coated with sound-absorbing shaped parts.

The air-conditioning system 10 according to the invention is also suitable for vehicles with water-cooled internal-combustion engines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An air-conditioning system for a vehicle having a housing in which an evaporator, a chamber and at least one fan are arranged, the housing having outflow ducts with individually blockable defroster nozzles, center nozzles and leg area nozzles, through which heated air and/or cold air can selectively be introduced into the vehicle interior, the housing being connected with at least one heated-air duct containing an exhaust heat exchanger as well as with inflow ducts for fresh air and circulating air, wherein heated air and/or fresh air and/or circulating air or cooled air is jointly introduced into at least one fan and is swirled together and mixed in this fan and wherein the mixed air is guided subsequently by way of individual outflow ducts to the vehicle interior and wherein a blow-out sensor is arranged behind the fan for scanning the temperature deviation ($\Delta T$) of the mixed air from the adjusted desired temperature and, as a function of the temperature deviation ($\Delta T$), automatically correcting the position of a temperature mixing flap provided in front of the fan.

2. An air-conditioning system according to claim 1, wherein said vehicle is an air cooled engine driven vehicle.

3. An air-conditioning system according to claim 2, wherein the inflow duct for fresh air and the inflow duct for circulating air are guided together in a common cold-air leg in which the evaporator viewed from the flow side, is arranged behind a pressure controlled circulating air flap and in front of a temperature mixing flap.

4. An air-conditioning system according to claim 3, wherein a fresh-air flap which is controlled by an electric motor, is arranged in the inflow duct for fresh air.

5. An air-conditioning system according to claim 3, wherein the pressure-controlled circulating-air flap is provided between the inflow duct for fresh air and the inflow duct for circulating air.

6. An air-conditioning system according to claim 2, wherein the connecting area of the cold-air leg and of the heated-air duct one temperature mixing flap respectively is arranged which is controlled by an adjusting motor.

7. An air-conditioning system according to claim 2, wherein a differential-pressure-controlled flap is arranged in the heated-air duct behind the exhaust heat exchanger this differential-pressure-controlled flap being actuated as a function of the position of the temperature mixing flap in such a manner that the differential-pressure-controlled flap opens automatically when the temperature mixing flap closes the heated-air duct.

8. An air-conditioning system according to claim 2, wherein two radial fans 34 are provided for the mixing of the heated air, the fresh air, the circulating air or cooled air in the housing of the air-conditioning system 9. An air-conditioning system according to claim 8, wherein the radial fans are arranged on the suction side with respect to the evaporator and the heated air.

* * * * *